April 30, 1929.  J. DUNLOP  1,710,767
BRAKE
Filed June 24, 1927   2 Sheets-Sheet 1

INVENTOR
James Dunlop
BY
ATTORNEY

April 30, 1929.  J. DUNLOP  1,710,767

BRAKE

Filed June 24, 1927  2 Sheets-Sheet 2

INVENTOR
James Dunlop
BY
ATTORNEY

Patented Apr. 30, 1929.

1,710,767

UNITED STATES PATENT OFFICE.

JAMES DUNLOP, OF CHICAGO, ILLINOIS, ASSIGNOR TO WESTINGHOUSE ELECTRIC & MANUFACTURING COMPANY, A CORPORATION OF PENNSYLVANIA.

BRAKE.

Application filed June 24, 1927. Serial No. 201,050.

The invention relates to improvements in brakes for elevators, and particularly motor-controlled brakes.

The primary object of the invention is to provide a new and improved brake in which the braking elements are released through the action of a motor.

Another important object of the invention is to provide a normal brake in which the movements of the braking elements are damped.

A still further object of the invention is to provide a novel brake which is operable by a motor, and in which the action of the motor is damped by a dash pot.

Further objects and advantages will become apparent as the description proceeds.

Figure 1:
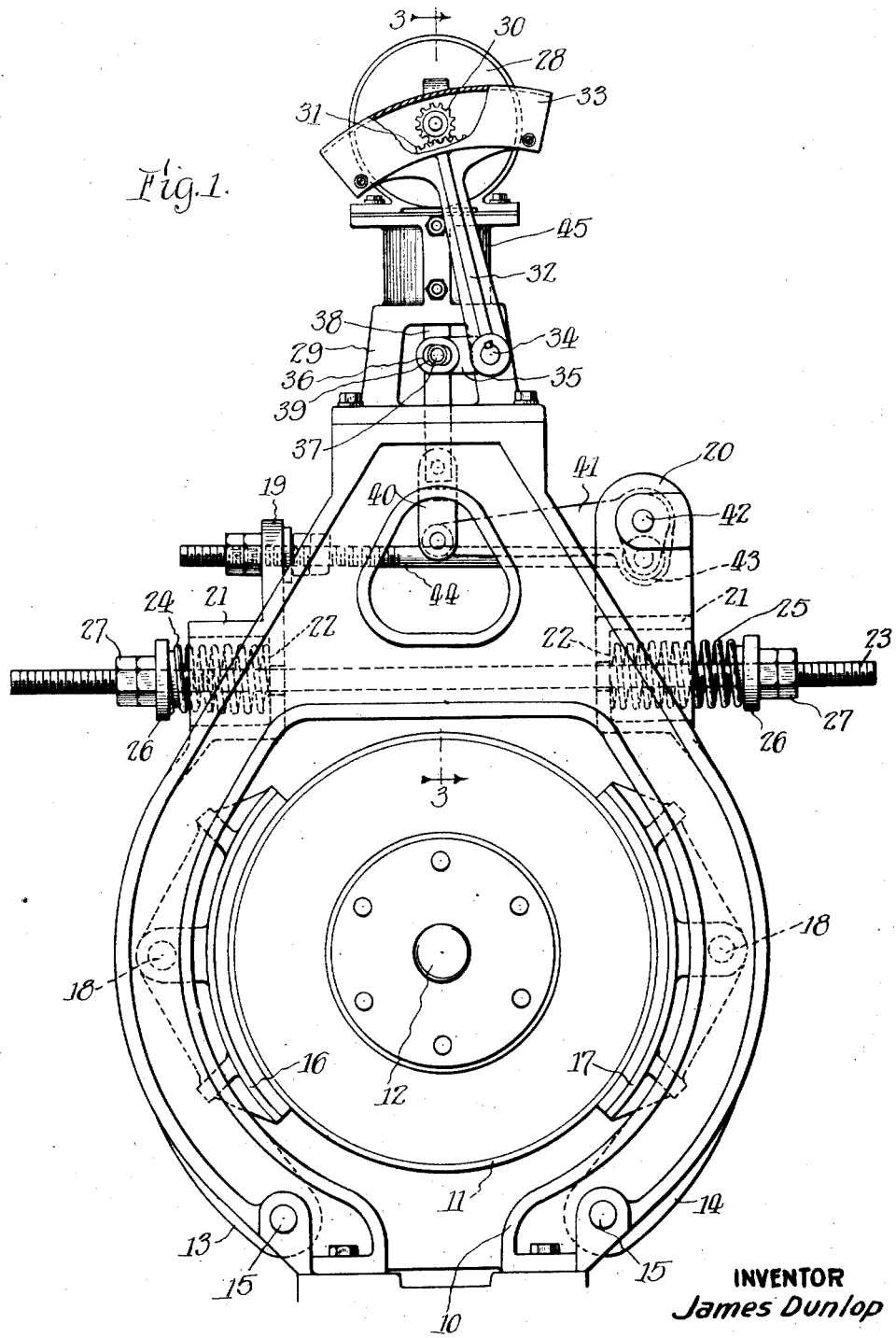
Figure 1 is an end elevation of a brake embodying the features of my invention.

While the invention is susceptible of various modifications and alternative constructions, I have shown in the drawings and will herein describe, in detail, the preferred embodiment, but it is to be understood that I do not thereby intend to limit the invention to the specific form disclosed, but intend to cover all modifications and alternative constructions falling within the spirit and scope of the invention.

Referring more particularly to the drawings, the brake comprises a hollow frame 10 in which a suitable brake drum 11 is mounted on a drive shaft 12.

A pair of brake arms 13 and 14 curve about opposite sides of the brake drum 11 and are pivoted at their lower ends on suitable pins 15 in the frame 10. Brake shoes 16 and 17 adapted to engage opposite sides of the brake drum 11 are pivotally mounted by means of pins 18 on the brake arms 13 and 14, respectively.

The upper ends of the brake arms 13 and 14 are formed integral with opposed vertical brackets or extensions 19 and 20, respectively. Each bracket is formed with a hollow housing 21 closed at the inner end to form a seat 22. A rod 23 extends centrally through the seats 22. Coil springs 24 and 25 are positioned on opposite ends of the rod 23 and, at their inner ends, engage the seats 22. The springs 24 and 25 are held on the rod 23 by suitable washers 26 and lock nuts 27, and tend, through the brake arms 13 and 14, to move the brake shoes 16 and 17 into engagement with the brake drum 11.

Means is provided for releasing the brake shoes 16 and 17. This means, in the present instance, comprises an electric motor 28 which is mounted on a standard or base 29 on the top of the frame 10 and is suitably connected to the brake arms 13 and 14 to separate them against the force of the springs 24 and 25. The motor shaft is provided with a pinion 30 which meshes with a gear segment 31 formed integral with the free end of a lever arm 32. The pinion 30 and the gear segment 31 are enclosed by a suitable guard 33 on the upper end of the lever arm 32. The lower end of the arm 32 is keyed to a shaft 34 suitably journaled in one side of the base 29. Keyed to the shaft 34 within the base 29 is a yoke 35, the arms of which have elongated openings 36 which fit over pins 37 projecting from opposite sides of a vertical piston rod 38. Preferably, a bearing ring 39 is interposed between each pin 37 and each arm of the yoke 35. The rod 38 is pivotally connected, at its lower end, to a yoke 40 which is pivotally connected to the long arm 41 of a bell-crank lever pivotally mounted on a shaft 42 in the upper end of the bracket 20. The short arm 43 of the bell-crank lever projects downwardly and has a crank-arm connection with the free end of a rod 44 rigidly secured, at its other end, to the upper end of the bracket 19. It will be evident that, by raising the lever arm 41, the brake arms 13 and 14 will be separated to release the brake.

Figure 3:
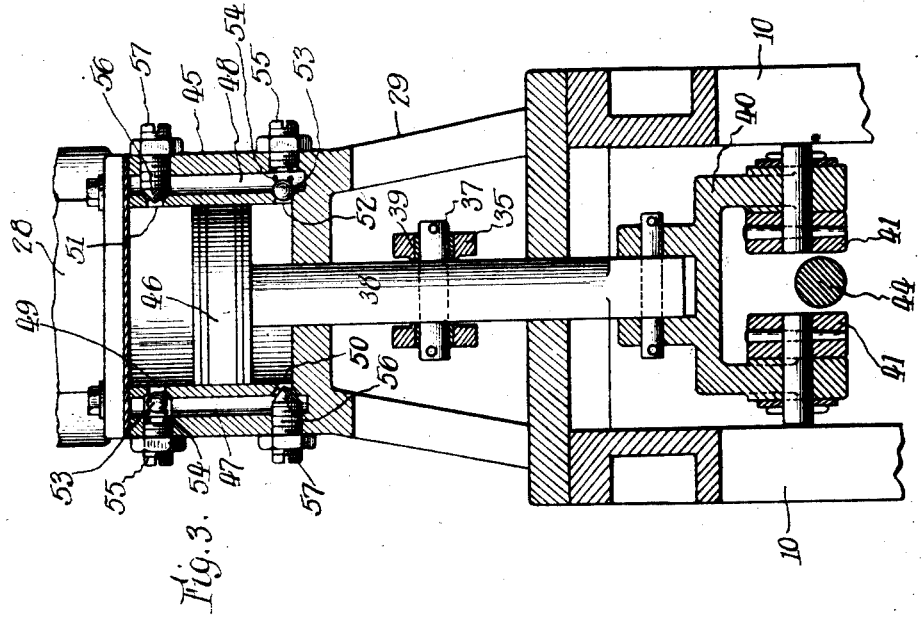
Fig. 3 is a fragmentary section taken along line III—III of Fig. 1.
Figure 2:
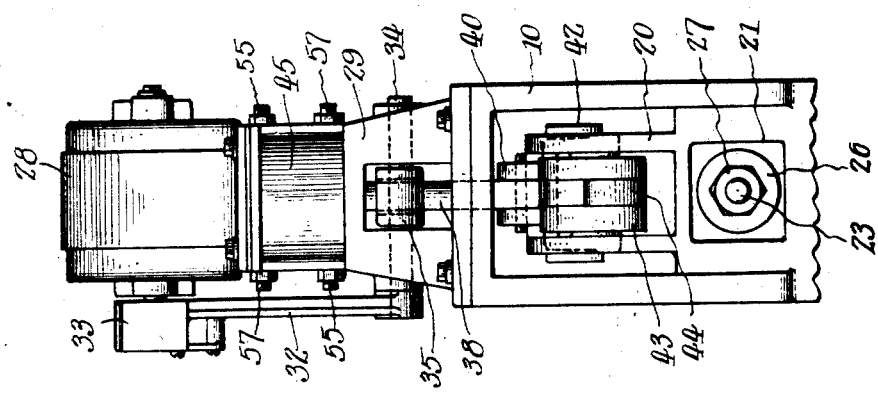
Fig. 2 is a fragmentary side elevation of the brake.

Means is provided for damping the movement of the rod 38 to prevent noise and wear. This means comprises a suitable dash pot. Referring particularly to Fig. 3, the dash pot comprises a cylinder 45 formed integral with, and on, the base 29. A piston 46 is reciprocably mounted in the cylinder 45 and is connected to the upper end of the rod 38. A pair of passages 47 and 48 are formed, respectively, in opposite walls of the cylinder 45. The passage 47 opens into opposite ends of the cylinder 45 through ports 49 and 50, and the passage 48 opens into opposite ends of the cylinder through ports 51 and 52. Each of the ports 49 and 52 is controlled by a ball valve 53 which is pressed against its seat by a spring 54. Each spring 54 abuts against the inner end of a set screw 55. Each of the ports 50 and 51 is controlled by a needle valve 56 formed on the inner end of a set screw 57. It will be evident that the passage 47 will permit the flow of fluid in one direction only from above the piston to below the piston and that the passage 48 will permit flow only in the opposite direction. The rate of flow may be adjusted by means of the set screws 55 and 57.

In operation, the brake shoes 16 and 17 are released by operating the motor 28 to swing the lever arm 32 to the right. The latter, through its connection with the arm 43, causes the brake arms 13 and 14 to be moved apart against the force of the springs 24 and 25. Upward movement of the piston rod 38 is damped by the piston and cylinder unit, the rate of movement being dependent upon the flow of air through the passage 47. When the brake shoes are to be applied, the motor 28 is reversed, thereby permitting the springs 24 and 25 to clamp the brake shoes 16 and 17 into engagement with the brake drum 11. The braking action is also damped or retarded by the piston and cylinder unit, the speed being determined by the rate of flow of the air through the passage 48.

It will be obvious that I have provided a highly efficient brake which is simple and inexpensive in construction. A positive separation is insured. The piston and cylinder unit, by damping the movements of the parts, prevents noises and sudden grasping movements.

I claim as my invention:

1. A brake having, in combination, a brake drum, a pair of pivotal brake arms mounted at opposite sides of said drum, brake shoes carried by said arms, spring means tending to move said arms together, means connecting said arms for moving said arms apart, a rod connected to said last mentioned means, a motor having a shaft, means operatively connecting the motor shaft to said rod, and a piston and cylinder unit on the end of said rod for controlling the clamping and releasing actions of the brake.

2. In an elevator brake, a brake drum, a support surrounding said drum, brake shoes carried by said support for cooperation with said drum, means normally biasing said brake shoes into contact with said drum, a motor on said support for releasing said shoes against the force of said bias and means located between said support and said motor for retarding the movements of said shoes.

3. In an elevator brake, a brake drum, a support surrounding said drum, brake shoes carried by said support for cooperation with said drum, means normally biasing said brake shoes into contact with said drum, a motor on said support for releasing said shoes against the force of said bias and means located between said support and said motor for retarding both release and application of said brake shoes.

4. In an elevator brake, a brake drum, a support surrounding said drum, brake shoes carried by said support for cooperation with said drum, means normally biasing said brake shoes into contact with said drum, a motor on said support for releasing said shoes against the force of said bias and a dash pot on said support for retarding the movement of said brake shoes, said dashpot forming a base for mounting said motor.

In testimony whereof, I have hereunto subscribed my name this sixteenth day of June, 1927.

JAMES DUNLOP.